United States Patent
Gandy

(10) Patent No.: US 10,190,351 B2
(45) Date of Patent: Jan. 29, 2019

(54) MULTIPLE DOOR CLOSER INSTALLATION SYSTEM

(71) Applicant: Joshua Gandy, Half Moon Bay, CA (US)

(72) Inventor: Joshua Gandy, Half Moon Bay, CA (US)

(*) Notice: Subject to any disclaimer, the term of this patent is extended or adjusted under 35 U.S.C. 154(b) by 222 days.

(21) Appl. No.: 15/357,991

(22) Filed: Nov. 21, 2016

(65) Prior Publication Data
US 2017/0167175 A1 Jun. 15, 2017

Related U.S. Application Data

(60) Provisional application No. 62/266,692, filed on Dec. 13, 2015.

(51) Int. Cl.
*E05F 7/00* (2006.01)
*G01C 9/24* (2006.01)

(52) U.S. Cl.
CPC .............. *E05F 7/00* (2013.01); *E05F 7/005* (2013.01); *G01C 9/24* (2013.01)

(58) Field of Classification Search
CPC .............. E05F 7/00; E05F 7/005; G01C 9/24
USPC .......................... 33/290, 645, 613, DIG. 21
See application file for complete search history.

(56) References Cited

U.S. PATENT DOCUMENTS

| | | | |
|---|---|---|---|
| 3,284,912 A * | 11/1966 | Hoven | E04F 21/003 30/167 |
| 3,496,594 A | 2/1970 | Arthur | |
| 3,618,160 A | 11/1971 | Ellis | |
| 4,062,123 A * | 12/1977 | Lundquist | B23Q 35/44 144/144.51 |
| 4,956,954 A | 9/1990 | Horgan | |
| 5,560,112 A * | 10/1996 | Stein | B23B 47/287 33/194 |
| 6,070,336 A * | 6/2000 | Rodgers | G01C 9/28 33/370 |
| 6,077,000 A * | 6/2000 | Gibbons | B23B 47/28 33/529 |
| 6,317,996 B1 * | 11/2001 | Myers | E05F 3/00 33/194 |
| 6,381,908 B1 * | 5/2002 | Fisher | E04G 21/1891 269/43 |
| 6,553,683 B1 * | 4/2003 | Klass | E04F 21/0076 33/1 AP |
| 7,127,777 B2 | 10/2006 | Chiang | |

(Continued)

*Primary Examiner* — Yaritza Guadalupe
(74) *Attorney, Agent, or Firm* — Steven A. Nielsen; www.NielsenPatents.com

(57) ABSTRACT

Concealed door closers are found in most commercial building and serve a useful purpose in controlling the closure of exterior entrance doors. The correct placement and installation of a door closer presents an arduous challenge for an installer who is often faced with uneven surfaces upon an active construction site. The related art relies upon the use of plumb bobs attached to upper door frame components and measuring implements placed upon ground surfaces. The task is so difficult that special training is required and specialist in the art are often employed install door closers. The presently disclosed embodiments comprise a jig system allowing for one or two door closers to be correctly positioned without the use of external or hand held measuring implements. An optional laser mounting system vitiates the need to attach lasers to door closer spindles.

8 Claims, 7 Drawing Sheets

(56) References Cited

U.S. PATENT DOCUMENTS

| | | | |
|---|---|---|---|
| 7,246,449 B2* | 7/2007 | Pierson | E05B 17/06 33/194 |
| 7,913,413 B2* | 3/2011 | McHowell | G01B 3/30 33/613 |
| 8,499,415 B2 | 8/2013 | Bai | |
| 2002/0170189 A1* | 11/2002 | Cheatham | G01C 15/12 33/194 |
| 2005/0257389 A1* | 11/2005 | Pierson | E05B 17/06 33/194 |
| 2013/0333296 A1* | 12/2013 | Lyons | E04F 21/0007 49/506 |
| 2017/0167175 A1* | 6/2017 | Gandy | E05F 7/00 |

* cited by examiner

MULTIPLE DOOR CLOSER INSTALLATION SYSTEM

CROSS-REFERENCE TO RELATED APPLICATION

This utility patent application claims the benefit of and priority of U.S. patent application Ser. No. 62/266,692 filed on Dec. 13, 2015 the contents of which are herein incorporated by referenced as if restated herein.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to the installation of concealed floor door closer systems. More particularly, the invention relates to means and methods of efficiently installing multiple door closer systems simultaneously and with greater accuracy as compared to the related art.

(2) Description of the Related Art

The known related art fails to anticipate or disclose the principles of the present invention.

In the related art, floor mounted closers are installed in a painstaking process that has failed to evolve over the past 30 years. Prior art installation methods include the use of plumb bobs to find the correct placement point of a spindle and the use of cross members directly attached to a concealed door closer, wherein the concealed door closer is secured in poured concrete. Thus, placement mistakes are costly and time consuming to repair in the prior art wherein concrete is broken apart to readjust a door closer.

In the related art, floor mounted closers are installed one at a time, with no means installing two closers at one time. In the related art, two separate set up protocols must be executed to align and set two door closers. This is a significant shortfall in the prior art as many installations involve two door closers per entrance. The prior art installation of a door closer requires exacting measurements of door threshold components and awkward adjustments of a closer to obtain square or true positioning with respect to floor and door jam components. Even a small error to properly align a door closer will result in a racking or binding of a door or other unacceptable door problems.

U.S. Pat. No. 4,956,954 issued to Horgan on Sep. 18, 1990 takes into account the use of a spindle of a door closer in the installation of glass doors, but fails to disclose or anticipate means of efficient alignment of the closer unit.

U.S. Pat. No. 7,127,777 issued to Chiang on Oct. 31, 2006 discloses means and methods of adjusting a hinge, but fails to disclose means of proper door alignment in the original installation of a door.

U.S. Pat. No. 8,499,415 issued to Bai on Aug. 6, 2013 discloses a floor spring unit of a door closer but fails to address the challenge of properly installing a door closer.

U.S. Pat. No. 3,496,594 issued to Arthur on Feb. 24, 1970 discloses an adjustable coupler for a door closer but fails to address the challenge of properly installing a door closer.

The general use of door closers or door control units is wide spread and may be seen in most commercial buildings. For example, U.S. Pat. No. 3,618,160 issued on Nov. 9, 1970 and assigned to Rixson discloses a door control unit having a spindle and various mechanical means of controlling the speed of a door closing. In a commercial setting, main entrance doors, often made of glass, need to be self-closing as building visitors are not going to take time to open and close a door by hand. A door closer needs to be correctly positioned and installed before the door may be secured within the threshold. The door closer needs to be well secured within the floor so as to support a heavy glass door, thus door closers are often secured within a floor by use of concrete. Unfortunately, the prior art fails to provide efficient means of installing door closers, which often leads to the breaking of concrete to reinstall door closers.

Thus, there is a long felt need in the art for the present invention.

BRIEF SUMMARY OF THE INVENTION

The present invention overcomes shortfalls in the related art by presenting an unobvious and unique combination and configuration of methods and components to efficiently and if, needed, simultaneously install two concealed door closers by use of a specialized jig system and integrated laser mounting system. The door closers being concealed or disposed at or below the floor level.

The invention overcomes shortfalls in the related art by using a jig system with a longitudinal body having U shaped fitting systems on either end. The longitudinal body further comprises lateral cross members used in leveling the jig, with leveling accomplished by use of screws or other means of height adjustment. The spindle of a concealed door closer is fitted within the U shaped fitting system of a disclosed jig system, obviating the need of the prior art's intricate alignment and measurement systems. A properly aligned spindle will fit into a bottom void of an entrance door and will act as the lower pivot point for the door. Thus, proper spindle placement is critical to ensure proper door function. The movement of the spindle is controlled by the internal components of the door closer.

Disclosed embodiments overcome shortfalls in the art by the use of an integrated laser mount system that seamlessly integrates into a disclosed jig system. A disclosed laser mount system may be attached near the center point of a spindle and may enable a laser housing to dispose a laser light directly above the center point of a spindle during the installation process. The disclosed configurations overcome shortfalls in the related art as lasers do not need to be attached directly upon a spindle, wherein a laser may slip upon a spindle. Moreover, the attachment of the laser mount system upon either end of the disclosed dual jig system overcomes shortfalls in the art as the door closer, spindle and jig may move and be adjusted at the same time as part of the door closer installation process. The laser mount or Z bar laser mount may be attached to a cross member which in turn is attached to a longitudinal body section. The integral integration of the Z bar laser mount ensures that the spindle and door closer are properly aligned to any upper door frame targets, such an upper door pivot point.

The disclosed embodiments overcome shortfalls in the prior art as fastener placement includes the use of a plurality of primary fasteners wherein primary fasteners attach to and penetrate through a cross member, longitudinal body section and into threaded voids of the door closer. The primary fasteners overcome shortfalls in the art as the jig, door closer and attached laser mount are all secured within the same vertical plane, avoiding the problem of flex or twisting of the jig system. Thus, the spindle, door closer and laser placement may be executed with minimal twisting or contortion of the jig system to ensure a fast and accurate installation. Moreover, flex, twist or other contortions of the jig system are further minimized by the artful use of a handle that adds rigidity to the longitudinal body. The handle having a lower vertical edge disposed upon an upper horizontal plane of the longitudinal body minimizes flex or bowing of the jig, an important attribute when setting two door closers at once.

The disclosed embodiments overcome shortfalls in the prior art of door closer installation by use of an artfully placed and secured circular bubble level. The disclosed bubble level placement aligns the bubble center point with that of the spindle and aligns the bubble center point between the center points of the leveling screws. Thus, the disclosed bubble level placement provides the most accurate and relevant reporting of comparative height.

The disclosed embodiments overcome shortfalls in the art by presenting means and methods of setting two concealed floor door closers with one jig and without movement of the jig. Thus, two concealed floor door closers may be installed at once, saving time and money.

These and other objects and advantages will be made apparent when considering the following detailed specification when taken in conjunction with the drawings.

Figure 1:
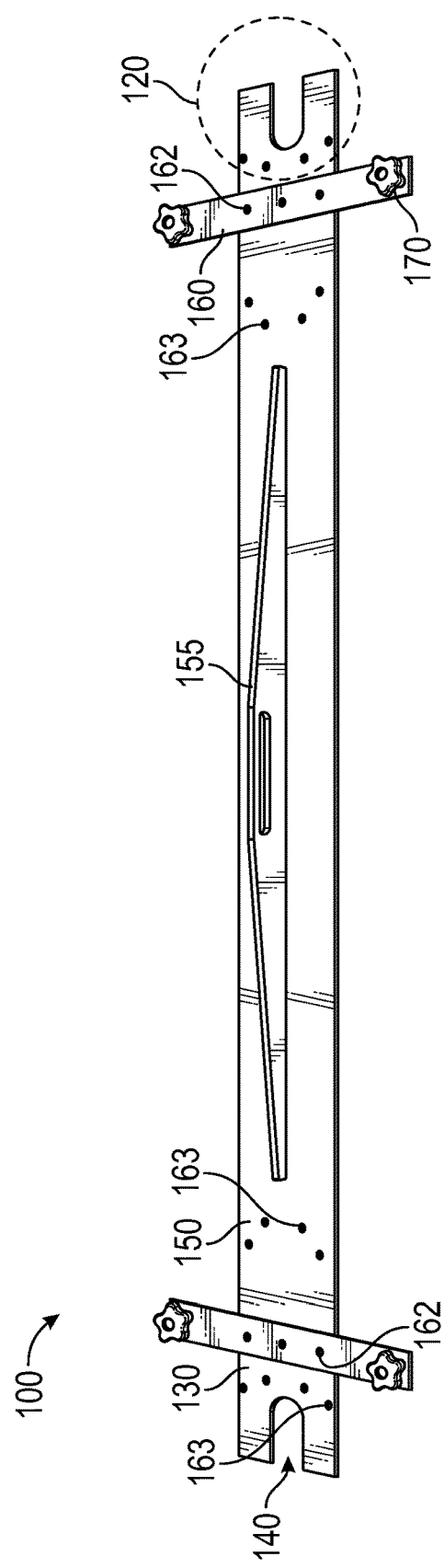
FIG. 1 depicts a perspective view of a disclosed jig system

REFERENCE NUMERALS IN THE DRAWINGS 100 a disclosed jig system in general
120 U shaped assembly of a jig system
130 U shaped protrusions or support members
140 U shaped void defined by the U shaped protrusions
142 inner arch area of U shaped void 140
150 longitudinal body section of a jig
155 handle
156 handle void defined with in the handle 155
160 cross members for height adjustment
161 threaded leveling screw void defined with a cross member 160
162 primary fastener void to attach cross member 160 to longitudinal body and into a door closer
163 secondary fastener voids to attach longitudinal body section 150 to a door closer
165 circular bubble level
170 leveling screws or other means of height adjustment
300 concealed door closer by Dorma
320 concealed door closer by Rixon
350 spindle of a concealed door closer
355 door armature
370 replica or box form of a door closer used for illustration or measurement purposes
375 spindle component of door closer replica 370
400 integrated laser mount system
410 laser housing
420 Z bar laser mount
421 lower void defined within the lower horizontal member 422 of Z bar laser
422 lower horizontal member of Z bar laser mount 420
423 "S" shaped transition member of Z bar laser mount 420
424 upper horizontal member of Z bar laser mount 420
425 upper void defined within the upper horizontal member 424 of the Z bar laser mount
426 laser mount to laser housing fastener
428 laser mount to cross member fastener

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 depicts a disclosed jig system 100 comprising a longitudinal body section 150, two or more cross members 160 with the cross members comprising leveling screws 170 or other means of height adjustment. The jig system may further comprise a U shaped assembly 120 on one or both ends with the U shaped assembly comprising two U shaped protrusions 130 or members that may define an interior U shaped void 140. The U shaped void may be used to place, position or align a spindle of a floor mounted door closer. The jig system may be attached to a handle 155.

The handle may have a hand void for easy transport. The handle may have a lower vertical edge attached to or disposed upon the upper horizontal surface of the longitudinal body section 150. This artful placement of the handle upon the longitudinal body section minimizes flex or bowing of the jig, allowing for both ends of the jig to align or place door closers. Due to the weight of the closers and the rigidity of the objects or sidewalls of a door closer subfloor space, avoiding flex of the jig is critical in executing a dual door closer installation. In a dual installation, both ends of the jig need to stay straight and planar, attributes that are achieved by the disclosed handle placement and other disclosed system attributes.

Other shortfalls in the art are overcome by the use of both primary fastener voids 162 and secondary fastener voids 163. A plurality of primary fasteners ensure a maximum amount of rigidity and alignment between the door closer, longitudinal body section 150, and cross member 160, as a primary fastener may penetrate or be secured to such components and may terminate within threaded voids of the door closer. Such threaded voids within the door closer are native to the door closer and are later used to secure a cover upon the door closer. The vertical integration of such components maximizes the cohesiveness of the components to assist in an accurate alignment of the door closers. The secondary fastener voids 163 allow for direct attachment of the longitudinal body section 150 to the installed door closer. The voids for the secondary fasteners 163 may take the shape of an arc to comport to the native screw voids at the perimeter of the door closer.

Figure 2:
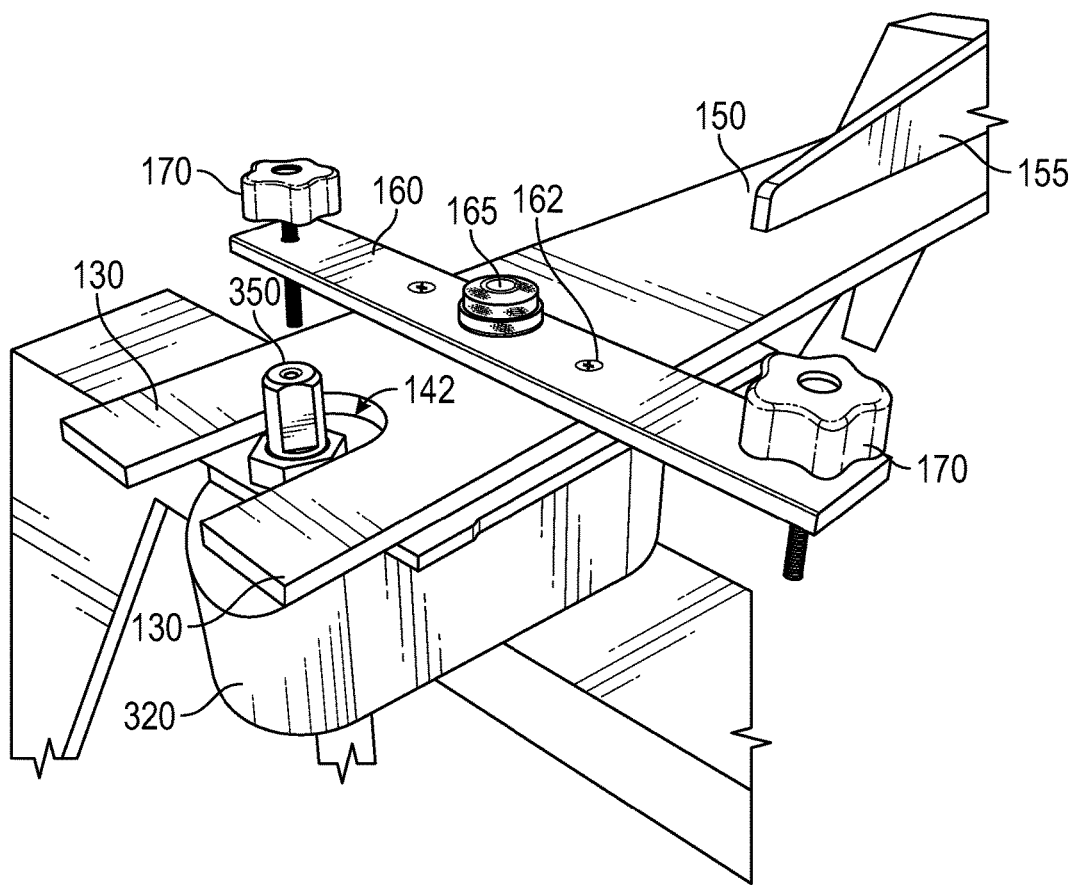
FIG. 2 depicts a perspective view of a disclosed jig system used to set a concealed door closer

FIG. 2 depicts a jig system used to align or place a floor mounted door closer 320 in a proper position in a door installation. A circular bubble level 165 is proximally and centrally disposed upon the cross member 160. The use and placement of the circular bubble level 165 overcomes shortfalls in the art by providing a relevant reporting by being aligned with the spindle 350. Thus, measurements of leveling are relevant to the spindle as the circular level 165 is centrally aligned with the spindle. Leveling screws 170 are attached to the cross member 160. A spindle 350 is shown to be placed within the void area defined by two U shaped protrusions 130. FIG. 2 further depicts a longitudinal body section 150 of a jig receiving structural support from a handle 122. Leveling screws 170 are in linear alignment with the bubble level 165, as are fasteners attaching the cross member 160 to the longitudinal body section 150. Such fasteners may also penetrate into or be secured into native screw voids of the door closer.

The U shaped protrusions 130 or support members overcome shortfalls in the related art by creating or defining an inner arch area 142 that comports to the lower portions of the spindle such that a perfect spindle to door jam distance is achieved by use the jig. Thus, the artful combination of the arch area 142 and the U shaped protrusions 130 acts to retain the circular spindle member and place the spindle to a predefined distance from the door jam. The length of the U shaped protrusions 130 or legs may be adjusted to comport with all brands and makes of concealed door closers.

Figure 3:
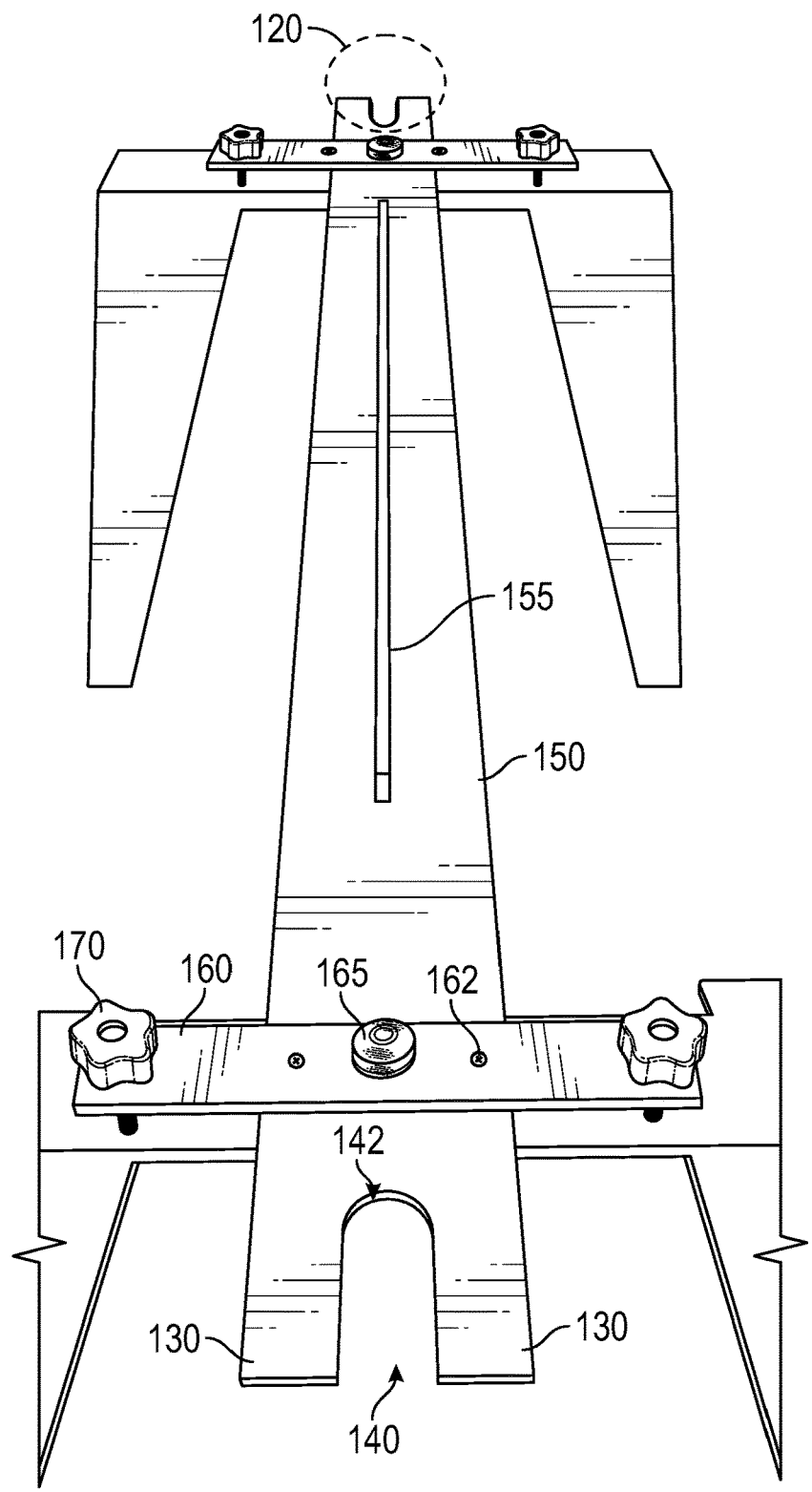
FIG. 3 depicts a perspective view of a disclosed jig system

FIG. 3 depicts a jig system wherein two U shaped protrusions 130 define a U shaped area 140 as well as in inner arch area 142. The jig of FIG. 3 is not shown with a door closer and is shown in an elevated position by use of saw horses. Even an in elevated position, the jig does not sway due to the reinforcement of the straight lower edge of the handle 155. The jig may comprise a handle 155 disposed upon or attached to a longitudinal body section 150 with the longitudinal body section having one or two sets of U shaped assemblies 120 with each U shaped assembly comprising two U shaped protrusions 130. Near or proximal to each U shaped assembly 120, a cross member may be attached to the longitudinal body section 150 with each cross member having two ends with each end having a threaded void and each treaded void mated to a leveling screw 170.

Figure 4:
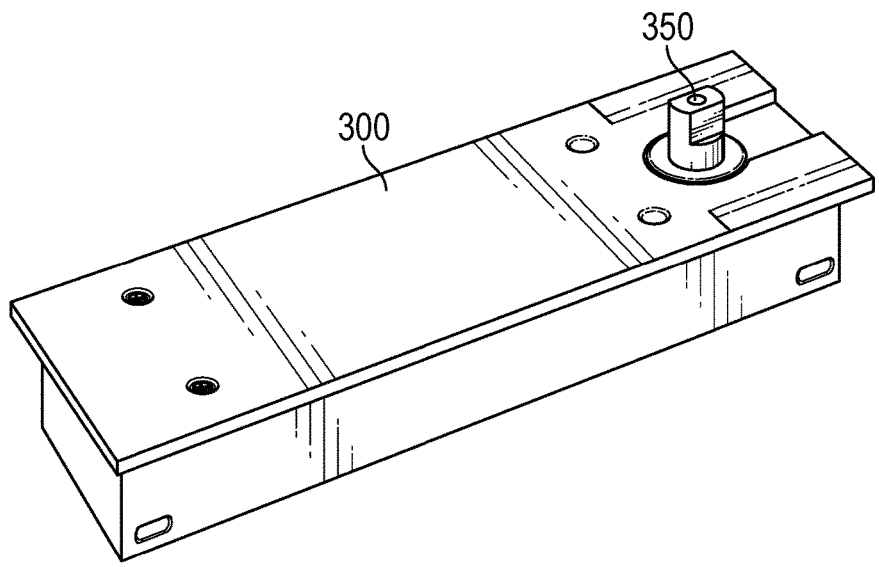
FIG. 4 depicts a perspective view of a floor mounted closer by Dorma

FIG. 4 depicts a floor mounted door closer 300 by Dorma that comprises a spindle 350.

Figure 5:
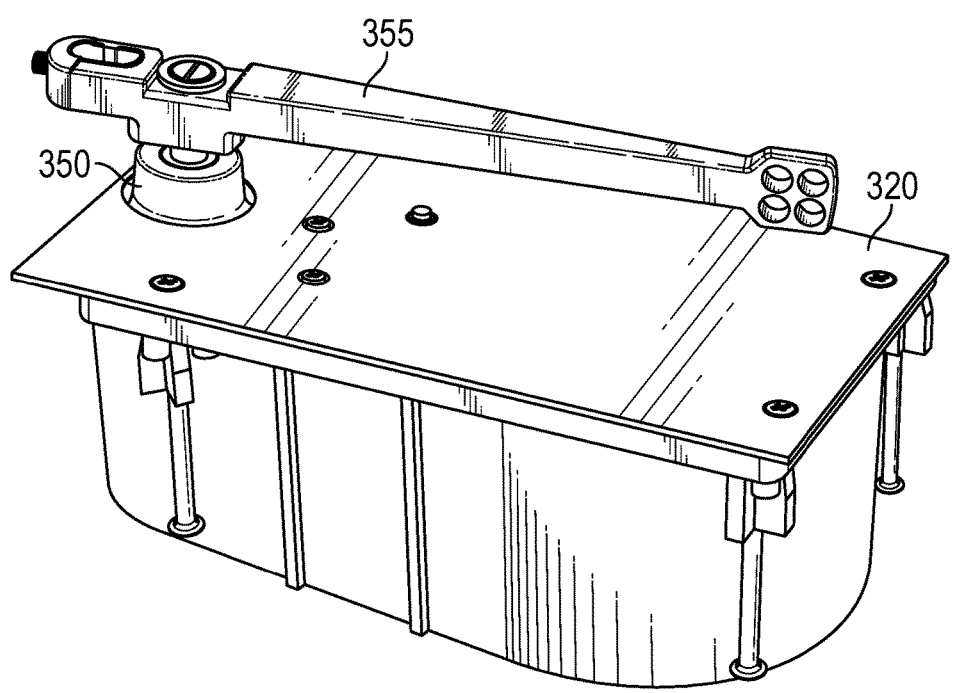
FIG. 5 depicts a perspective view of a floor mounted closer by Rixon

FIG. 5 depicts a floor mounted door closer 320 by Rixon with the door closer shown with a spindle 350, with the spindle attached to a door armature 355.

Figure 6:
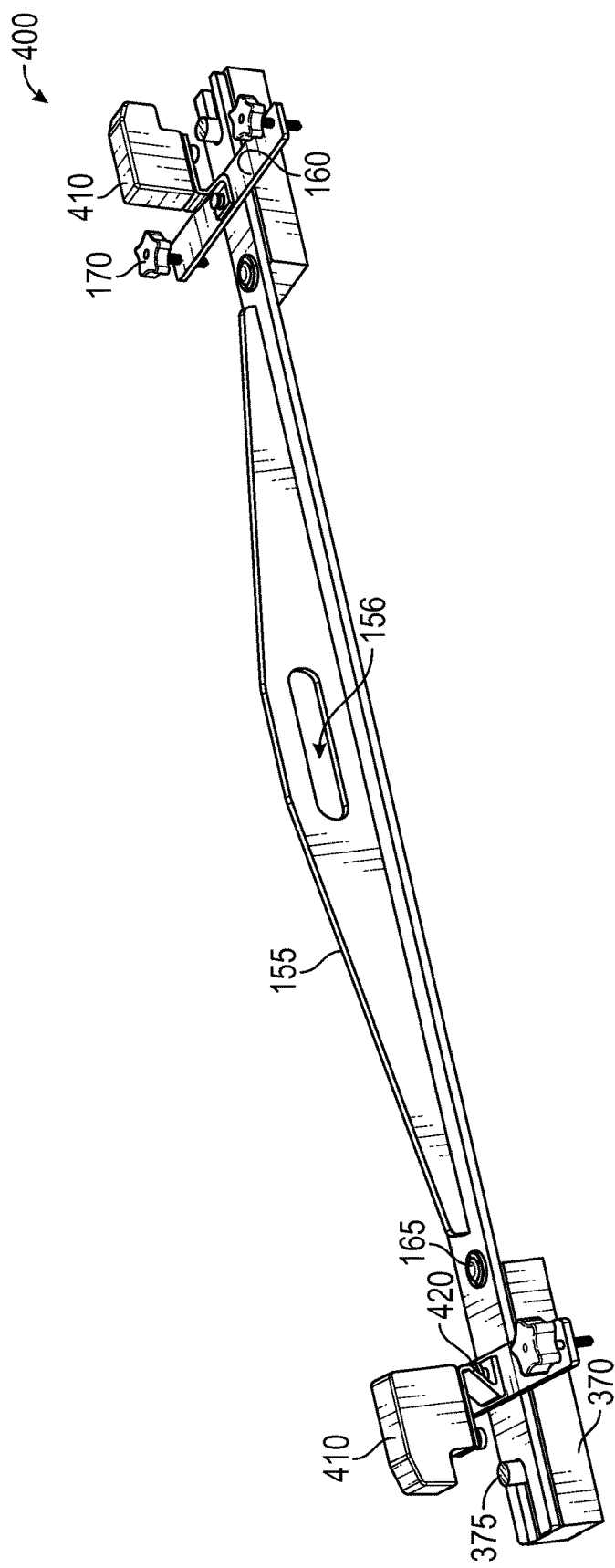
FIG. 6 depicts a perspective view of a disclosed jig system with an integrated laser mount system

FIG. 6 depicts a disclosed jig system having an optional integrated laser mount system 400 which may comprise a Z bar laser mount 420 having a lower end attached upon the cross member 160 with the Z bar laser mount having an upper end attached to a laser or laser housing 410. The artful combination of the Z bar laser mount 420 and laser housing 410 places a vertical laser beam directly above the spindle such that the laser beam will precisely project a beam of light directly above the spindle, allowing for the correct placement of the door closer such that upper portions of door attached to the spindle will be correctly placed. The jig of FIG. 6 is depicted with a replica or box form of a door closer 370 with the replica having a spindle component 375 to demonstrate the fit of a spindle within the inner arch area of the U shaped void.

Figure 7:
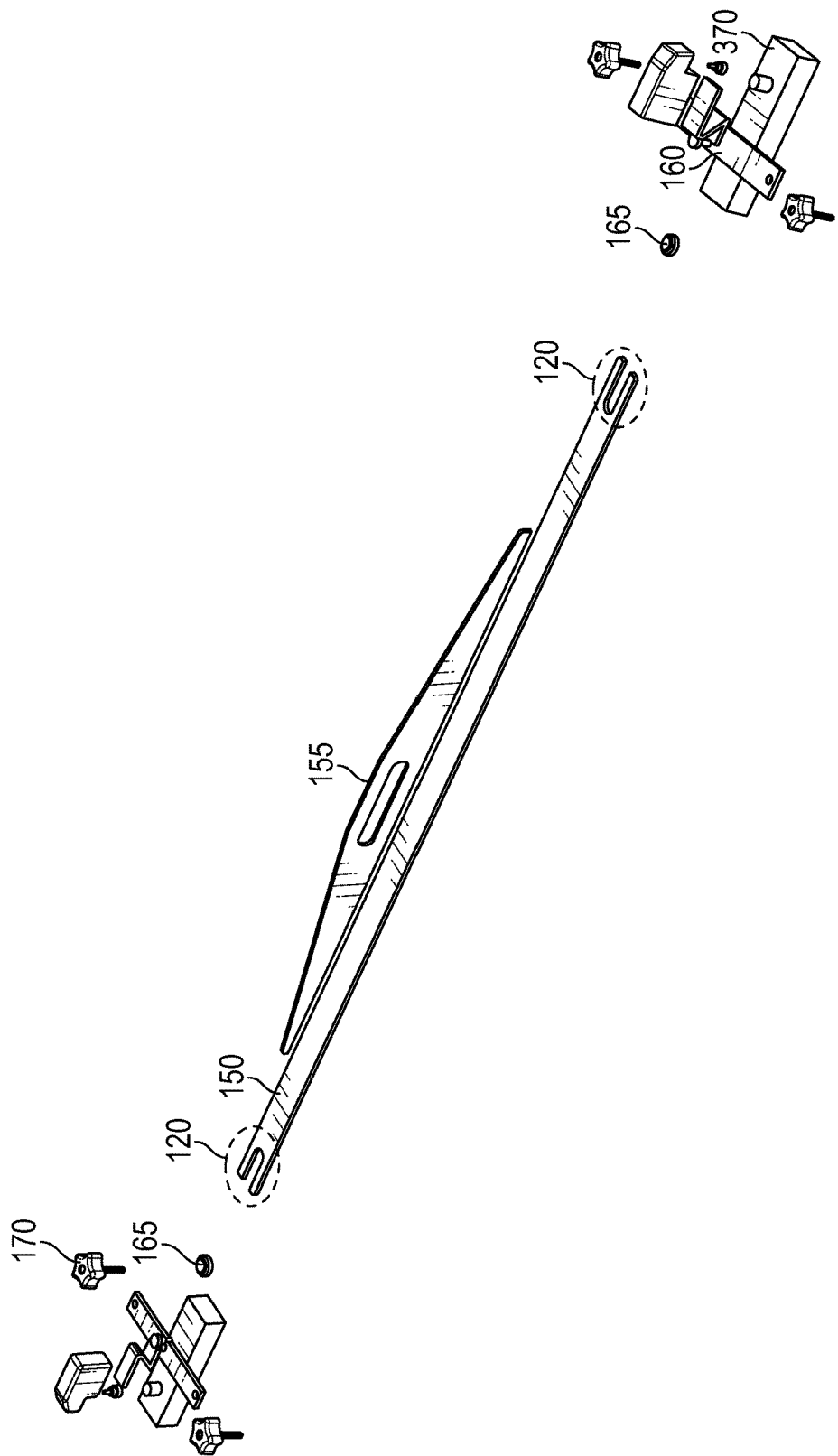
FIG. 7 depicts an exploded view of a disclosed jig system with an integrated laser mount system

FIG. 7 depicts an exploded view of FIG. 6 and more clearly shows the longitudinal body section 150 having a first and second end, with each end having a U shaped assembly 120. The cross members 160 are shown with voids at each end such that leveling screws 170 may be inserted.

Figure 8:
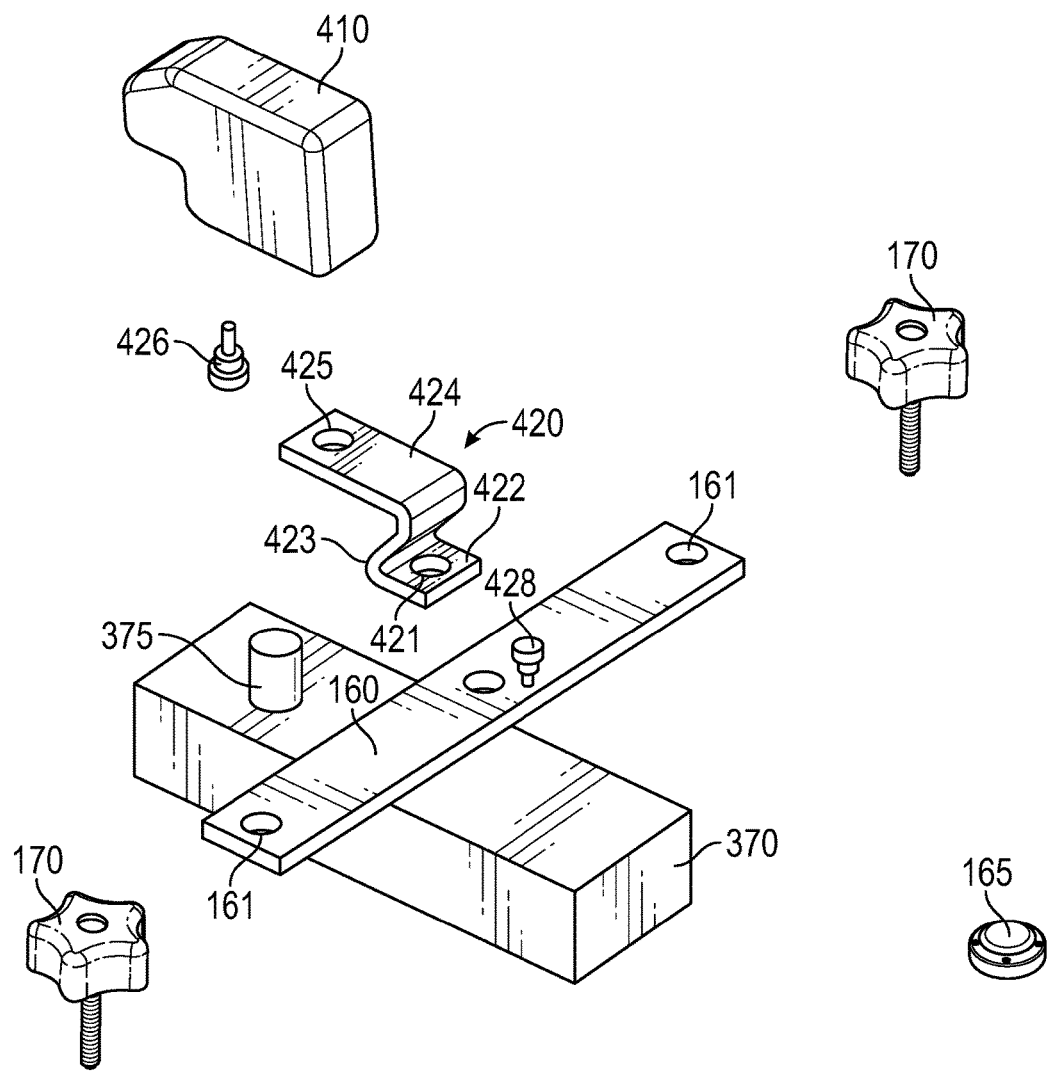
FIG. 8 depicts an exploded view of various components

FIG. 8 depicts an exploded view of end components which may include a cross member 160 having a first and second end, with each end defining a threaded leveling screw void 161 with each threaded leveling screw void mated to a leveling screw 170. For purposes of illustration a door closer replica is shown below the cross member 160.

A Z bar laser mount 420 may comprise a lower horizontal member 422 which may define a lower void 421. A Z bar laser mount 420 may further comprise a S shaped transition member 423 attached to the lower horizontal member 422 and an upper horizontal member 424. The unique configuration of the Z bar laser mount 420 having a relatively shorter lower horizontal member 422 attached to a S shaped transition member 423 attached to a relatively longer upper horizontal member 424 overcomes shortfalls in the art as an attached laser housing 410 may project a laser beam upwardly and directly over a spindle disposed within a U shaped assembly. The disclosed configuration allows a mounted laser to stay attached to the jig, job after job, with no need to attach lasers or plumb bobs at door headers as found in the related art.

The unique configuration or design of the Z bar laser mount 420 allows for the use of a laser mount to cross member fastener 428 in tight quarters as well as the use of a laser mount to laser housing fastener 426 to secure a laser housing 410 to the upper horizontal member 424 of the Z bar.

Items.

Disclosed embodiments may include the following items or summary of components.

1. A jig system for the installation of one or two door closers, the jig system comprising:

a) a longitudinal body section (150) having six sides and a first end and a second end, with the first end and the second end each comprising a U shaped assembly (120) with each U shaped assembly comprising a set of two U shaped protrusions (130) defining a U shaped void (140) and an inner arch area (142);

b) a handle (155) having six sides including a bottom side centrally disposed upon to an upper horizontal side of the longitudinal body section;

c) a first cross member 160 attached to the first end of the longitudinal body section and a second cross member attached to the second end of the longitudinal body section;

d) the first and second cross members each having a first and second end, with each first and second end defining a threaded leveling screw void (161) and each threaded leveling screw void mated to a comporting leveling screw (170).

2. The jig system of 1 wherein the handle (155) defines a handle void (156).

3. The jig system of 1 wherein a first circular bubble level (165) is centrally disposed upon the first cross member and wherein a second circular bubble level is centrally disposed upon the second cross member.

4. The jig system of 1 wherein the first end and the second end of the longitudinal body section each define a plurality of secondary fastener voids (163) with each secondary fastener void comporting to a threaded void of a door closer.

5. The jig system of 1 wherein the first end and the second end of the longitudinal body each define a plurality of primary fastener voids (162) with each primary fastener void positioned to accept a fastener passing through a respective cross member.

6. The jig system of 5 wherein each primary fastener void is further positioned to accept a fastener passing through to a threaded void of a door closer.

7. The jig system of 1 further comprising a laser mount system (400), with the laser mounting system comprising:

a) a Z bar laser mount (420) comprising a lower horizontal member (422) defining a lower void (421);

b) with the lower horizontal member attached to a S shaped transition member (423);

c) with the S shaped transition member attached to an upper horizontal member (424);

d) with the upper horizontal member defining an upper void (425).

8. The jig system of 7 with the laser mount system further comprising a laser housing disposed upon the upper horizontal member.

9. The jig system of 8 with the laser mount system centrally disposed upon a cross member.

What is claimed is:

1. A jig system for the installation of one or two door closers, the jig system comprising:

a) a longitudinal body section (150) having six sides and a first end and a second end, with the first end and the second end each comprising a U shaped assembly (120) with each U shaped assembly comprising a set of two U shaped protrusions (130) defining a U shaped void (140) and an inner arch area (142);

b) a handle (155) having six sides including a bottom side centrally disposed upon to an upper horizontal side of the longitudinal body section;

c) a first cross member (160) attached to the first end of the longitudinal body section and a second cross member attached to the second end of the longitudinal body section;

d) the first and second cross members each having a first and second end, with each first and second end defining a threaded leveling screw void (161) and each threaded leveling screw void mated to a comporting leveling screw (170) the jig system further comprising a laser mount system (400), with the laser mounting system comprising:

a) a Z bar laser mount (420) comprising a lower horizontal member (422) defining a lower void (421);

b) with the lower horizontal member attached to a S shaped transition member (423);

c) with the S shaped transition member attached to an upper horizontal member (424);

d) with the upper horizontal member defining an upper void (425).

2. The jig system of claim 1 wherein the handle (155) defines a handle void (156).

3. The jig system of claim 1 wherein a first circular bubble level (165) is centrally disposed upon the first cross member and wherein a second circular bubble level is centrally disposed upon the second cross member.

4. The jig system of claim 1 wherein the first end and the second end of the longitudinal body section each define a plurality of secondary fastener voids (163) with each secondary fastener void comporting to a threaded void of a door closer.

5. The jig system of claim 1 wherein the first end and the second end of the longitudinal body each define a plurality of primary fastener voids (162) with each primary fastener void positioned to accept a fastener passing through a respective cross member.

6. The jig system of claim 5 wherein each primary fastener void is further positioned to accept a fastener passing through to a threaded void of a door closer.

7. The jig system of claim 1 with the laser mount system further comprising a laser housing (410) disposed upon the upper horizontal member.

8. The jig system of claim 7 with the laser mount system centrally disposed upon a cross member.

* * * * *